Jan. 9, 1962 J. LE MAY 3,016,039
PHOTOGRAPHIC FILM COATING AND STRAIGHTENING DEVICE
Filed Oct. 10, 1958
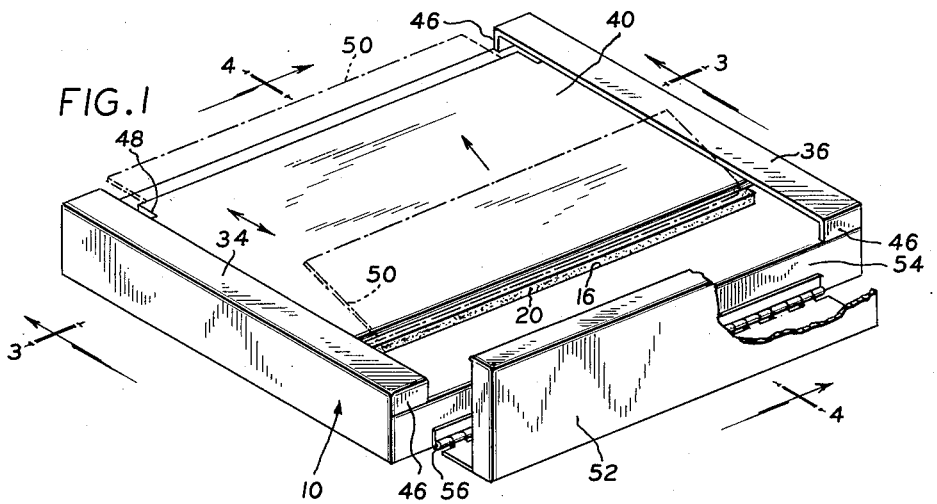
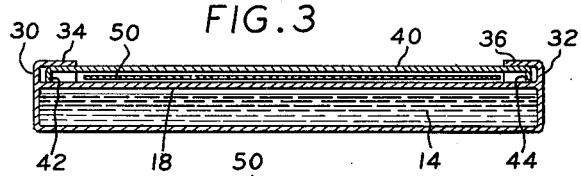
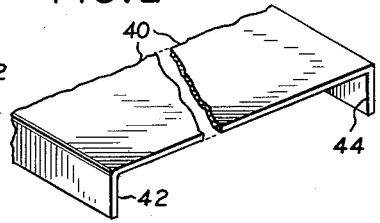
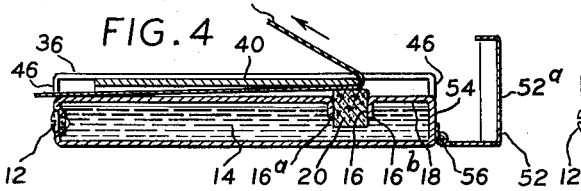
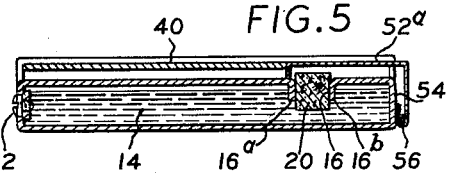
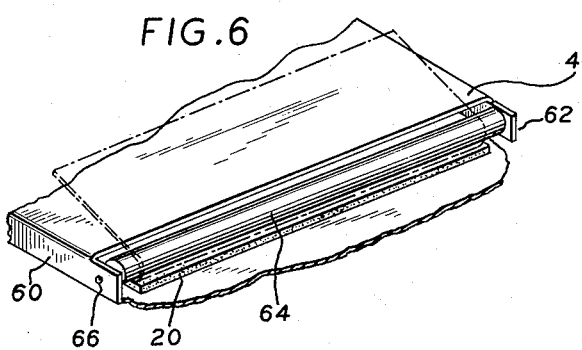
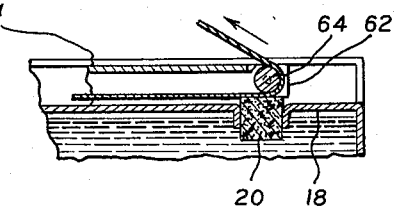
INVENTOR
JOSEPH LE MAY
BY
ATTORNEY

United States Patent Office 3,016,039
Patented Jan. 9, 1962

3,016,039
PHOTOGRAPHIC FILM COATING AND
STRAIGHTENING DEVICE
Joseph Le May, 102—38 185th St., Hollis 23, N.Y.
Filed Oct. 10, 1958, Ser. No. 766,521
2 Claims. (Cl. 118—253)

This invention relates to a device for fixing and straightening photographic film.

Although the invention has wide application to many kinds of photographic film, it is intended mainly for use in connection with film adapted for use in Polaroid Land cameras, commonly known as self-developing cameras. The film in such cameras is exposed in the usual way and then developed within the camera housing. When it is developed it is removed from the camera housing and then fixed.

The fixer may be applied in various ways, as for example by immersing the film in a bath or by coating the film by means of a brush or other applicator. In addition to fixing the film it is also necessary to straighten it and this is conventionally done by rubbing it against the edge of a table or any other suitable and convenient object. Both the fixing and the straightening are time consuming operations which are relatively primitive in their procedure when compared with the virtually automatic operation of the camera itself.

It is the object of this invention to provide a device which may eventually be used to fix such photographic film while at the same time straightening it.

Specifically, the present device comprises a container for the fixer, an applicator on said container exposed to the fixer and being adapted by capillary action or otherwise to meter and dispense or apply said fixer, and a guide mounted on said container and adapted to guide a sheet of photographic film of the character described to said applicator. More precisely, the film is drawn manually between the guide and the applicator, the guide holding said film against the applicator to enable the latter to apply the fixer to said film. As the film is drawn away from the guide, it is caused to rub against the guide in substantially the same manner as such film is now conventionally rubbed against a table edge in order to straighten it and the effect of such engagement with the guide is to produce a straightened sheet of photographic film.

An important feature of the present invention is the shape of the container, its applicator and its guide. The container consists of a relatively flat, shallow box of generally rectangular configuration and sufficiently compact for slipping into a pocket. Its width exceeds, slightly, the width of a conventional sheet of photographic film of the character under discussion, so as to accommodate such film. The applicator is seated in a slot formed in said container across its width and the length of said applicator is sufficient to enable it to extend across such photographic film. By the same token, the guide extends across the width of the container and adds little to the overall dimensions of the container. The entire device, therefore, may be very conveniently carried and equally as conveniently used.

In the preferred form of the invention, the guide is simply a plate which is slidably mounted on the container. It adds nothing to the width of the container since it is carried entirely within portions of the container and more particularly tracks or rails secured to the container. The guide is slidable toward and away from the applicator in order to facilitate placing the photographic film in operative position on the container and moving it against the applicator. The guide may be positioned with its forward edge directly above the applicator so that as the film is drawn between said guide and said applicator, the guide will cause it to bear directly against the applicator with sufficient pressure to cause a wiping action to take place between the applicator and the film. Since the applicator is saturated with the fixer solution such interaction between the applicator and the film will coat the film with the fixer, uniformly, in metered quantity, and automatically as the film is drawn against the applicator.

It will be understood that the exposed face of the film is thereby brought into contact with the applicator, the back of the film bearing against the guide. As the film is drawn away from the applicator, the back of the film is rubbed against the forward edge of the guide. This causes the film to straighten since the normal curvature of the film is reversed in the course of such rubbing action.

In one form of the present invention a roller is mounted at the forward end of the guide and it is against said roller that the film is drawn during the fixing process last above mentioned and also to remove and straighten the film following such fixing process. The roller reduces the friction between the film and the guide to prevent damage or injury to the film in the hands of a person unfamiliar with the procedure herein described.

Another feature of the invention is the cover which may be moved in one direction to expose the applicator for use and which may be moved in the opposite direction to cover the applicator when the device is not in use. When the applicator is thus covered, the fixer is protected against evaporation and the entire device may also be carried in a pocket without danger that the applicator will come in contact therewith.

The invention is illustrated in the accompanying drawing in which:

FIG. 1 is a perspective view of a device made in accordance with this invention showing its movable parts in position to enable it to be used to fix and straighten photographic film.

FIG. 2 is a perspective fragmentary view of the slidable guide element of said device.

FIG. 3 is a sectional view on the line 3—3 of FIG. 1.

FIG. 4 is a sectional view on the line 4—4 of FIG. 1.

FIG. 5 is a view similar to that of FIG. 4 but showing the cover in closed position.

FIG. 6 is a fragmentary perspective view of a guide element made in accordance with a modified form of the invention, showing it to be provided with a roller which is adapted to engage the film.

FIG. 7 is a fragmentary sectional view somewhat resembling FIG. 4, but showing the film in engagement with the roller of FIG. 6.

Referring now to the drawing, it will be observed that the present device includes a container 10 which is generally rectangular in shape and relatively flat and shallow so as to fit conveniently into a coat pocket or the like. A screw plug 12 is provided in one wall of the container and said plug is removable in order to fill the container with a fixing solution 14. The plug may of course be used as a closure for the container after it is filled.

An elongated opening 16 may be provided in the top wall 18 of the container in order to accommodate an applicator 20. In one form of this invention, said slot 16 may be formed by slitting the top wall 18 and bending the marginal edges on both sides of the slit downwardly to form a pair of spaced, generally parallel flanges 16a and 16b respectively. These flanges would then serve as a pair of retaining elements or walls adapted to hold the applicator 20 between them.

Applicator 20 may be made of any suitable material such as felt or soft sponge. The material should be adapted to take up a sufficient quantity of the fixing solution to cause it to become saturated therewith and to transfer the solution to the film during the course of the wiping action which has above been referred to. The material should however be so soft that it will not scratch or otherwise mar the film surface.

A pair of vertically extending flanges 30 and 32 are forced along the side edges of the container and a pair of horizontal, inwardly extending flanges 34 and 36 are formed on said vertical flanges 30 and 32 respectively. Flanges 30, 34 and 32, 36 define a pair of tracks or guide rails which are adapted to hold guide plate 40 in place above top wall 18 of the container. Guide plate 40 is simply a rectangular plate with a pair of downwardly projecting flanges 42 and 44 formed along its side edges. These flanges 42 and 44 serve as bearings to slidably support the guide plate 40 on top wall 18 of the container and also to space said guide plate sufficiently to clear the applicator. End pieces 46 may be formed at the ends of flanges 30, 32, 34 and 36 to serve as stop members relative to the guide plate in order to prevent said guide plate from coming off the container. Notches or cutouts 48 may be forced in the corners of the guide plate to extend its range of movement despite the presence of the stop members 46.

In the use of the present device, a sheet of film 50 is inserted between the guide plate 40 and the top wall 18 of the container, the emulsion coated side of the film face down. Guide plate 40 is retracted during insertion of said film to facilitate such insertion and also to provide adequate clearance between said guide plate and applicator 20. Once the forward end of the film is brought into position above the applicator, the guide plate 40 is moved forwardly to press to film against the applicator. The film is now drawn upwardly in the direction of the arrow in FIG. 4 and it will be noted that the back of the film is thereby rubbed against the forward edge of the guide plate. Thus, while the applicator wipes the face of the film and coats it with the fixing solution, the forward edge of the guide plate straightens the film. At the conclusion of the operation the guide plate may be retracted preparatory to inserting another sheet of film for the purposes under discussion.

It will be understood that the guide plate may be moved forwardly until it covers the applicator in order to protect the applicator when the device is inserted into a coat pocket or the like. However, in the preferred form of this invention as illustrated particularly in FIGS. 1, 4 and 5 a cover 52 is provided to enclose the applicator when the device is not in use. This cover is pivotally connected to the front wall 54 of the container by means of a hinge 56. As shown in FIGS. 1 and 4 said cover may be pivoted to open position in order to expose the applicator for use. In FIG. 5 the cover is shown in closed position wherein it covers the applicator and protects it against contact with foreign objects and also helps prevent evaporation of the fixing solution. In closed position, top wall 52a of the cover occupies a common plane with guide plate 40. This is seen in FIG. 5.

The showing in FIGS. 6 and 7 corresponds to that of the preceding figures of the drawing except that side flanges 60 and 62 of guide plate 40a are somewhat wider or higher than those of guide plate 40 and furthermore, unlike the corresponding flanges of guide plate 40, flanges 60 and 62 project forwardly of guide plate 40a The forwardly projecting portions of said flanges 60 and 62 are adapted to receive a roller 64 between them. A pin 66 rotatably supports said roller on said flanges 60 and 62.

When the device shown in FIGS. 6 and 7 is used, the film is drawn between roller 64 and applicator 20 in order to create the wiping action necessary to coat the film with the fixing solution. The film is also pulled around said roller, as shown in FIG. 7 in order to straighten the film at the same time that it is coated with said fixing solution.

The foregoing is illustrative of preferred forms of this invention and it will be understood that these preferred forms may be modified and other forms may be provided within the broad spirit of the invention and the broad scope of the claims.

I claim:

1. A photographic film coating and straightening device of the character described, comprising a container for a fixing solution, an applicator mounted on said container in contact with the fixing solution to become saturated thereby, and a guide element mounted on said container adjacent said applicator, said guide element and said applicator being adapted to receive a photographic film between them, the exposed face of the film against the applicator and the back of the film against the guide element, the spatial relationship between said guide element and said applicator being such as to permit such photographic film to be drawn manually between them, the guide element bearing against the film to hold said film in wiping contact with the applicator in order to coat the exposed face of the film with the fixing solution, said guide element being also adapted to bear against the film to straighten it as it is drawn manually between said guide element and said applicator, a pair of guide tracks being provided on the container along opposite sides of its top wall, said guide element comprising a guide plate which is slidably mounted in said guide tracks for horizontal movement toward and away from said applicator, said guide plate being movable away from the applicator to facilitate insertion of a photographic film between them and being movable into a position closely adjacent said applicator in order to press the photographic film against the applicator, as it is drawn manually between said guide plate and said applicator, to provide a wiping action between the film and the applicator and thereby to coat said film with the fixing solution, and an applicator cover hingedly secured to the container, the guide plate being retractable to expose the applicator and the applicator cover being pivotally movable into covering position relative to said applicator to prevent evaporation of the fixing solution therefrom.

2. A photographic film coating and straightening device in accordance with claim 1, wherein a roller is rotatably mounted on the guide plate adjacent the applicator in order to reduce friction between the film and the guide plate when the film is drawn manually between the guide plate and the applicator.

References Cited in the file of this patent

UNITED STATES PATENTS

| | | |
|---|---|---|
| 946,963 | Granger | Jan. 18, 1910 |
| 2,085,862 | Lee | July 6, 1937 |
| 2,142,348 | Dornseifer | Jan. 3, 1939 |
| 2,684,048 | Marrollo | July 20, 1954 |
| 2,689,307 | Fairbank | Sept. 14, 1954 |
| 2,854,908 | Eloranta | Oct. 7, 1958 |
| 2,860,438 | Gumbinner | Nov. 18, 1958 |
| 2,861,885 | Land | Nov. 25, 1958 |
| 2,908,025 | Ashby et al. | Oct. 13, 1959 |
| 2,963,953 | Bishop et al. | Dec. 13, 1960 |